United States Patent

Evenson

[15] 3,655,251

[45] Apr. 11, 1972

[54] ELLIPTICAL ROLLER BEARING

[72] Inventor: Christopher B. Evenson, Loran Route, Box 151, Cottage Grove, Oreg. 97424

[22] Filed: July 15, 1970

[21] Appl. No.: 55,063

[52] U.S. Cl. ............................................308/183, 308/206
[51] Int. Cl. .....................................F16c 23/08, F16c 19/40
[58] Field of Search..................308/194, 202, 203, 204, 206, 308/215, 214, 213, 183

[56] References Cited

UNITED STATES PATENTS 2,865,688  12/1958  Lemont, Jr. ............................308/194

FOREIGN PATENTS OR APPLICATIONS 62,286  9/1923  Sweden................................308/194

*Primary Examiner*—Edgar W. Geoghegan
*Assistant Examiner*—Frank Susko
*Attorney*—Eugene M. Eckelman

[57] ABSTRACT

A roller bearing assembly employing a plurality of elliptical roller bearings in surface contact and arranged to provide improved alignment in a race assembly. In an exemplary assembly, an inner race on a shaft has a convex surface and a first elliptical roller bearing has a concavity intermediate its ends having a radius equal to the radius of the curvature of the race for rolling contact therewith. The concavity of the first elliptical bearing has rolling contact with the convex or profile surface of a second elliptical roller bearing operating on an axis parallel with the axis of the first roller bearing but spaced outwardly therefrom. The assembly also includes a third elliptical roller bearing which operates on an axis parallel with the others and which has a peripheral concavity intermediate its ends. This latter concavity has a radius equal to the profile radius of the second roller bearing and is engaged by such convex surface. The convex or profile surface of the third roller bearing is in rolling contact with the concave surface of an outer race.

3 Claims, 6 Drawing Figures

Patented April 11, 1972

INVENTOR.
CHRISTOPHER B. EVENSON
BY Eugene M. Eckelman
ATTY.

INVENTOR.
CHRISTOPHER B. EVENSON
BY Eugene M. Eckelman
ATTY.

INVENTOR.
CHRISTOPHER B. EVENSON
BY Eugene M. Eckelman
ATTY.

ELLIPTICAL ROLLER BEARING

BACKGROUND OF THE INVENTION

This invention relates to new and useful improvements in bearing assemblies and more particularly pertains to a roller bearing assembly utilizing roller bearings.

Roller bearings having various profile contours have heretofore been employed. Some include a spool type bearing such as shown in U.S. Pat. No. 1,220,345 or other contours such as shown in U.S. Pat. No. 1,510,920. Such structures are intended to carry a radial load and also a thrust load but are not intended or are capable of providing alignment of the bearing assembly and shaft so that the latter can adjust itself with outer supporting structure or to absorb vibration.

SUMMARY OF THE INVENTION

According to the invention and forming a primary objective thereof the present invention includes an assembly of elliptical roller bearings one of which has a convex surface and an intermediate peripheral concavity, the concaved portion of said roller bearing having engagement with a convex surface of a race member and also with the convex surface of a second elliptical roller bearing. It is a further object to provide in combination with the assembly just recited a third elliptical roller bearing having a peripheral concavity intermediate its ends the surface of which is in engagement with the convex surface of the second roller bearing, said roller also having peripheral surfaces adjacent its ends in engagement with a concave surface of a second race member, such structure providing a bearing assembly which provides for alignment of the bearing in either direction relative to the cage or to the shaft.

Another object is to provide an elliptical roller bearing assembly of the type described which includes in the combination three elliptical rollers two of which have engagement with inner and outer race members and the other of which comprises an idler roller therebetween, the first two mentioned rollers having a peripheral concavity intermediate their ends for engagement by the idler roller and engagement with respective cage members.

The invention will be better understood and additional objects and advantages will become apparent from the following description taken in connection with the accompanying drawings which illustrate preferred forms of the device.

DETAILED DESCRIPTION OF THE PREFERRED EMBODIMENTS

Figures 1, 2:
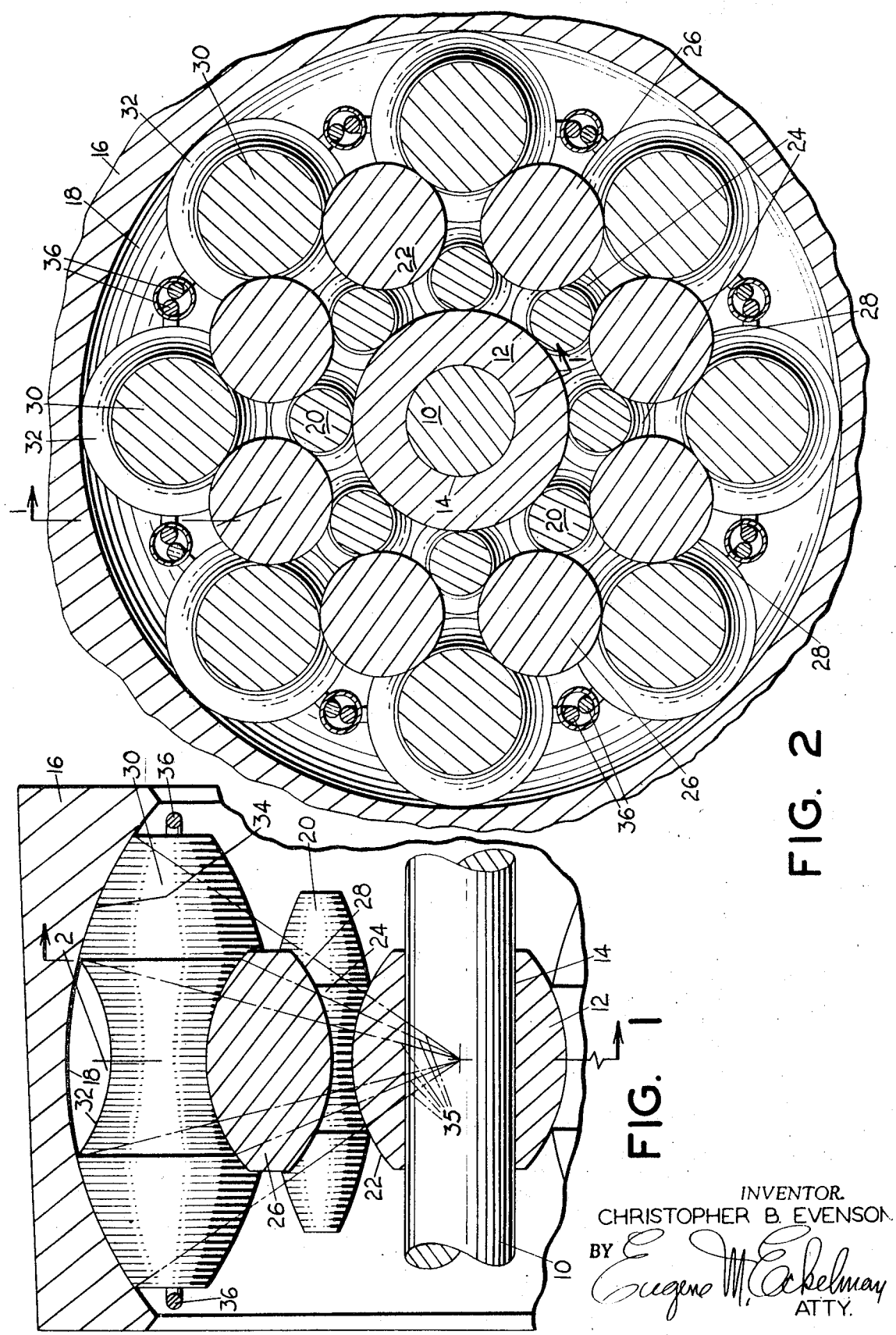
FIG. 1 is a fragmentary elevational view of an elliptical roller bearing assembly which constitutes features of the present invention, this view being taken on the line 1—1 of FIG. 2.
FIG. 2 is a cross sectional view taken on the line 2—2 of FIG. 1.

Referring now in particular to the drawings the present bearing assembly is for supporting a shaft 10 in a substantially friction-free load supporting and turning disposition. For the purpose of the present invention, the bearing assembly includes an inner race 12 which as best seen in FIG. 1 has a central bore 14 of a selected diameter whereby to have a press fit on the shaft 10. The bearing assembly also includes an outer race member 16 which for purposes of the instant invention has an inner bearing engaging surface 18 of concaved configuration.

Forming a part of the roller bearing assembly is a first elliptical roller bearing 20 which has rolling engagement with the inner race 12. For this rolling engagement, the inner race 12 has a convex outwardly directed curvature 22 and the bearing 20 has a peripheral concavity 24 intermediate its ends which has rolling engagement with the convex surface of the race 12. For this purpose, the two curvatures 22 and 24 have an identical radius.

A second elliptical roller bearing is contained in the assembly and is identified by the reference numeral 26. Such roller has a full length uniform curvature or profile 28 of the same radius of curvature as the radius of concavity 24. A roller bearing engagement is provided between the roller 26 and the roller 20.

A third roller 30 is employed in the assembly and, similar to the other rollers, is elliptical in shape. This latter bearing member has a peripheral concavity 32 intermediate its ends. The radius of curvature of concavity 32 is identical to the radius of curvature of the profile of surface 28 of the second elliptical surface 28 of the second elliptical roller bearing 26 and in the assembled position of the bearing these two surfaces are in rolling engagement.

The roller bearing 30 is elongated with relation to the other roller bearings in order that surface portions 34 on each side of the concavity are of a sufficient length to provide a good contact surface of the bearing 30 with the outer race 16.

By the arrangement of roller bearings and races provided, the three roller bearings have rolling contact with each other, the two outside rollers bearings having rolling contact with respective cage members and the middle roller bearing serving as an idler between the two. Such provides a friction free bearing connection between a shaft and outer race.

All of the arcs of contact radii of the profiles and concavities of the bearing members and cages intersect at a point on the axis of the shaft 10, as designated by the lines 35. The rollers can thus align themselves in different axial positions in the bearing assembly in the event that the shaft, for example should tilt a small amount. That is, the outer bearing member 30, even though in rolling contact with the inner surface 18 of the outer race 16, can slidably adjust longitudinally on said surface. Such may be necessary to compensate for vibratory or other movements of the shaft 10 or outer cage, it being apparent that all the bearing members are adapted for movement relative to directly associated bearing members because of the similarity of the radius of engaging surfaces. For example, if necessary the outer roller bearing 30 can slidably adjust longitudinally on the surface 18 while the roller bearing 26 remains in a fixed longitudinal position. Similarly, the rollers 30 and 26 could tilt slightly while the roller 20 remained in a fixed position; conversely the roller 20 could tilt with the shaft 10 while the rollers 26 and 30 remained in a fixed position. Such alignment of the various rollers in the assembly readily absorbs any vibration of the shaft 10 or small tilting movements of such shaft or outer cage and prolongs the life of the bearing and also provides a greater cushioning support for a shaft 10 than structures heretofore provided.

Figure 3:
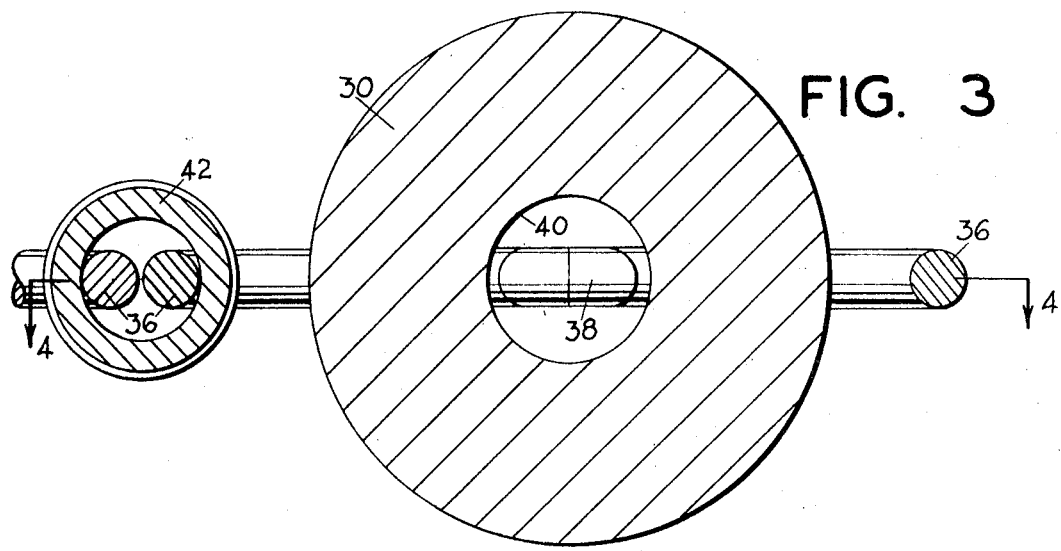
FIG. 3 is a fragmentary sectional view taken on a line similar to that of FIG. 2 but being enlarged and showing one roller bearing and cage holding means therefor.
Figure 4:
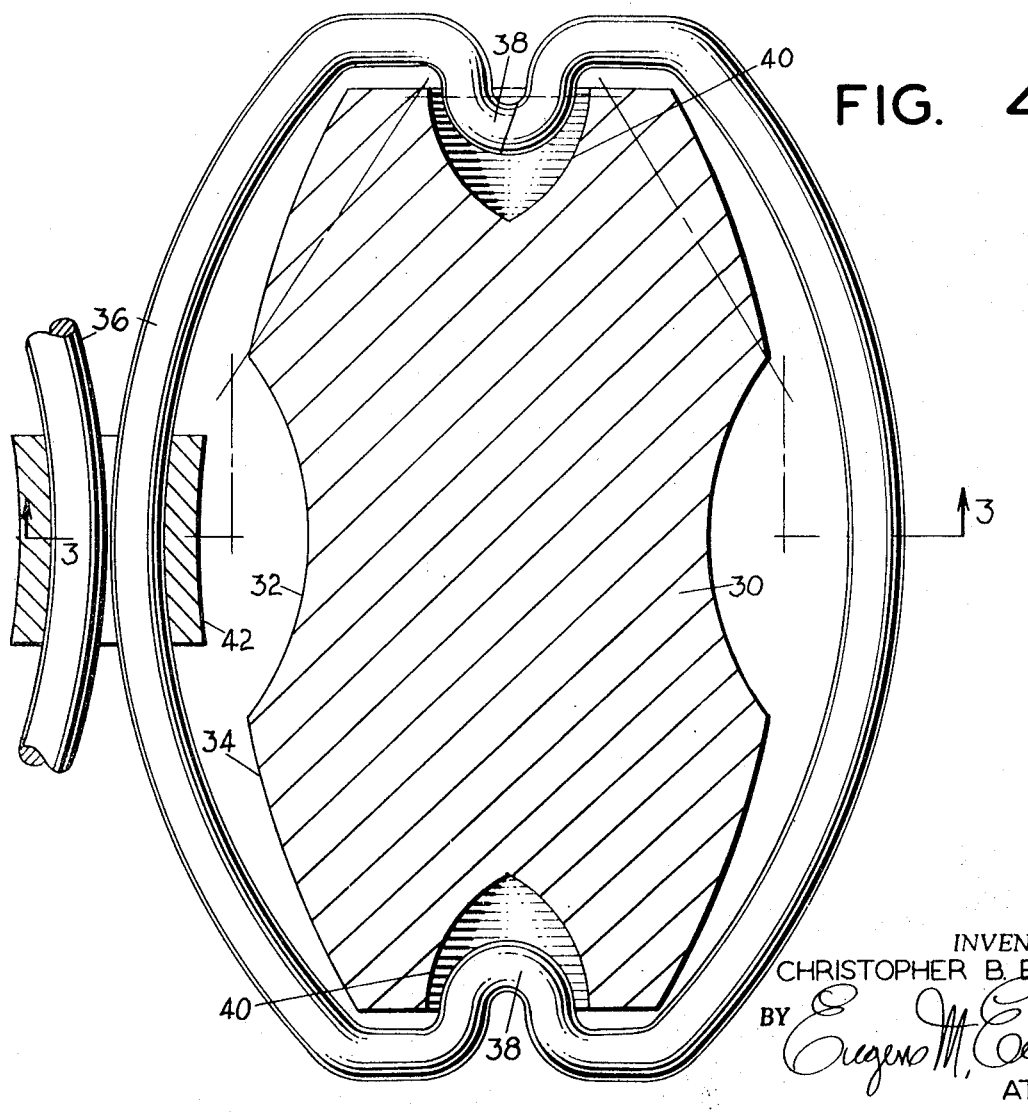
FIG. 4 is an enlarged sectional view taken on the line 4—4 of FIG. 3.

It is desired that the assembly have a spacing connection for the rollers around the shaft, and for this purpose such a connection on the outer rollers 30 is sufficient. The spacing connection is best shown in FIGS. 3 and 4 wherein each roller 30 has an encompassing ring 36 with inward projections 38 on their ends which engage in recesses 40 in the ends of the rollers 30. The plane of rings 36 extend at right angles to radii from the axis of the shaft 10 through rollers 30 and thus are out of the way of the engaging surfaces of the rollers 30 and the outer cage. The rings 36 in adjacent rollers are connected pivotally by means of longitudinally extending sleeves 42. Such connecting means 36 hold the assembly together but nevertheless allow slight adjustment within the assembly itself.

It is apparent that the roller bearing assembly of the instant invention has low friction rolling contact therewithin and in addition has substantially elongated rolling contact between the bearings and the cage members. Furthermore, the bearing readily absorbs any vibratory motion of the shaft or any tilting movement of such shaft or outer cage.

Figure 5:
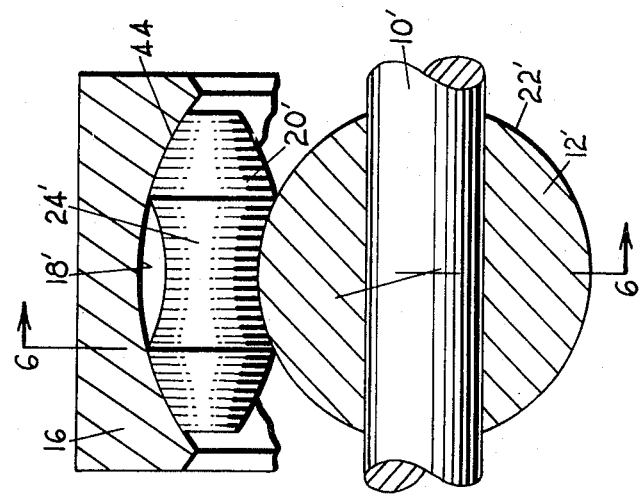
FIG. 5 is a fragmentary elevational view similar to FIG. 1 but showing alternative structure.
Figure 6:
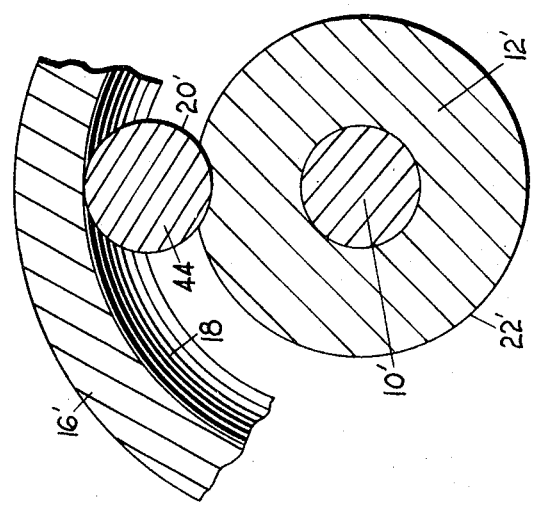
FIG. 6 is a fragmentary sectional view taken on the line 6—6 of FIG. 5.

In a second embodiment, FIGS. 5 and 6, an inner race 12' is secured on the shaft 10 and the assembly in its radial direction has a single elliptical roller bearing 20'. This roller bearing has a curved outer bearing or profile surface 44 and a peripheral concavity 24'. Inner race 12' has a convex curvature 22' of a radius identical to the radius of curvature of surface 24', whereby the roller 20' is adapted to have rolling engagement with the inner race in a full length contact throughout the surface 24'. The outer race 16' has an inner bearing surface 18' of identical curvature to the surface 44 for engagement by the bearing 20' in rolling contact.

The structure of FIGS. 5 and 6, although not providing a complete alignment or axial adjustment interiorly of the bearing as in FIG. 1, nevertheless allows for some of such adjustment. Such adjustment takes place on two surfaces, namely, the surface of engagement between the roller bearing 20' and the outer cage as well as the concaved surface 24' of the roller bearing 20' with the inner cage.

It is to be understood that the forms of my invention herein shown and described are to be taken as preferred examples of the same and that various changes in the shape, size and arrangement of parts may be resorted to without departing from the spirit of my invention.

Having thus described my invention, I claim:

1. A bearing assembly comprising
   a. a shaft,
   b. an inner race member arranged to be mounted on said shaft,
   c. an outer race member,
   d. and at least three elliptical roller bearings disposed between said inner and outer race members and having their axes parallel with said shaft, said elliptical roller bearings establishing bearing connection between said inner and outer race members, a first of said bearings being in engagement with the inner race member, a second of said bearings being in engagement with the outer race member, and a third of said bearings being in engagement with both said first and second bearings,
   f. said bearings and race members having a convex-concave engagement, with the curvatures thereof intersecting at a common point on the axis of said shaft.

2. A bearing assembly for rotatably supporting a shaft comprising
   a. a shaft,
   b. an inner race member arranged to be mounted on said shaft,
   c. said race member having a convexly curved outer surface,
   d. a first elliptical roller bearing having an exterior convexly curved surface,
   e. said first roller bearing having a peripheral concavity intermediate its ends in rolling contact with the said convexly curved outer surface of the inner race member,
   f. said concavity having a radius equal to the radius of the convexly curved outer surface of said inner race member,
   g. a second elliptical roller bearing having a convexly curved outer surface in rolling contact with the peripheral concavity of said first roller bearing,
   h. a third elliptical roller bearing having a peripheral concavity intermediate its ends in rolling contact with the convexly curved outer surface of said second roller bearing,
   i. and an outer race member,
   j. said outer race member having a concaved surface equal in radius to the exterior convexly curved surface of said third roller bearing and in rolling engagement with the latter surface,
   k. the curvatures and concavities of said race members and roller bearings intersecting at a common point on said shaft.

3. The bearing assembly of claim 2 including connectors attached to adjacent pairs of holders for holding the said third roller bearings in selected spaced relation from each other.

* * * * *